No. 831,506. PATENTED SEPT. 18, 1906.
H. GEISENHÖNER.
OIL RING.
APPLICATION FILED APR. 6, 1905.

Witnesses:

Inventor:
Henry Geisenhöner
by
Att'y.

UNITED STATES PATENT OFFICE.

HENRY GEISENHÖNER, OF SCHENECTADY, NEW YORK, ASSIGNOR TO GENERAL ELECTRIC COMPANY, A CORPORATION OF NEW YORK.

OIL-RING.

No. 831,506.                Specification of Letters Patent.                Patented Sept. 18, 1906.

Application filed April 6, 1905. Serial No. 254,088.

*To all whom it may concern:*

Be it known that I, HENRY GEISENHÖNER, a citizen of the United States, residing at Schenectady, county of Schenectady, State of New York, have invented certain new and useful Improvements in Oil-Rings, of which the following is a specification.

The object of my present invention is the production of an oil-ring for lubricating shaft-bearings, which is comparatively light in weight, cheaply made, and possesses excellent mechanical and operating qualities.

The various features of my invention are pointed out with particularity in the claims annexed to and forming a part of this specification. For a better understanding of my invention, however, reference may be had to the drawings, in which I have illustrated one of the forms in which my invention may be embodied.

Figure 3:
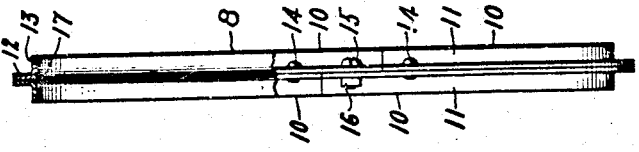
Figure 2:
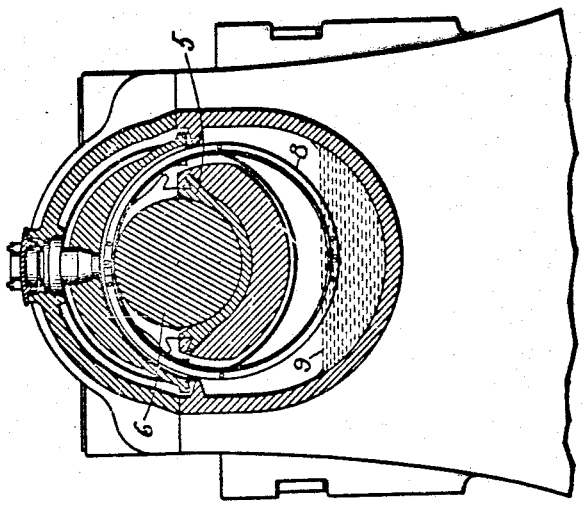
Figure 4:
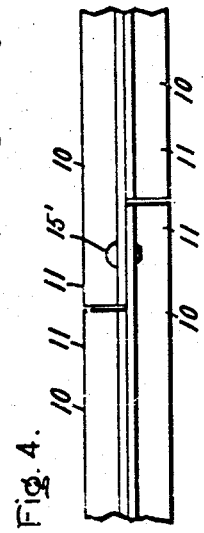
Figure 1:
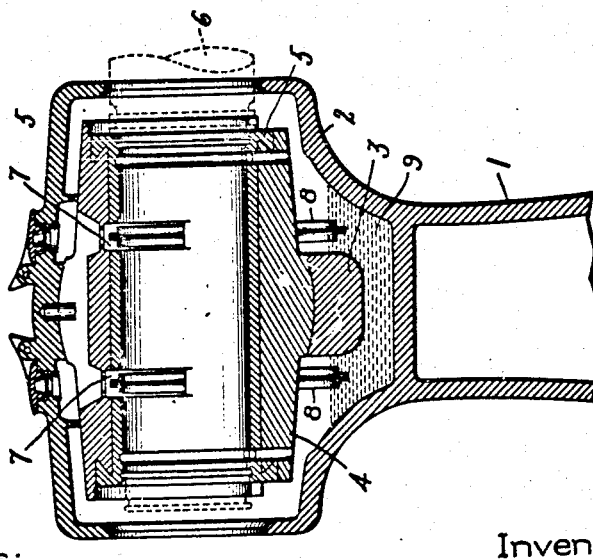

Of the drawings, Figure 1 is a sectional elevation of a journal shaft-bearing and supporting-box. Fig. 2 is a sectional elevation taken at right angles to Fig. 1. Fig. 3 is an elevation with parts broken away and in section of an oil-ring, and Fig. 4 is a plan view showing a modification.

Referring to the drawings, 1 represents a pillow-block of the usual form provided at its upper end with a bearing-box 2. In the bearing-box 2 the usual supporting member 3 supports a bearing 4 proper, which may be formed in two parts and be provided with the usual soft-metal lining 5. In the bearing 4 and lining 5 a shaft 6 (shown in dotted lines in Fig. 1 and in full lines in Fig. 2) revolves. Passages 7, which may be of the usual form, are provided in the upper portion of the bearing 4 and lining 5.

Circular oil-rings 8 extend through the passages 7. The oil-rings 8, which are considerably larger in diameter than the shaft 6, on the upper side of which they rest, surround the lower portion of the bearing and dip into the lubricating material 9 contained in the lower portion of the bearing-box.

In the form in which my invention is shown in the drawings each oil-ring is made in two similar segmental parts or sections 10. Each of the sections 10 is formed of two semicircular pieces 11 of material, such as sheet-brass or the like, L-shaped in cross-section, which are permanently secured together. As is clearly shown in Fig. 3, each piece 11 comprises a radial portion 12 and a portion 13, projecting at right angles from the inner edge of the radial portion—that is, one leg of the L is radial and one leg is parallel to the axis of the ring. The pieces 11 forming each section of the ring are reversely placed, so that the radial portions 12 come together. The pieces 11 forming each half of the ring are secured together in any suitable manner, as by means of rivets 14 passing transversely through the radial portions 12 of the member. In securing together the parts 11 forming each half of the collector-ring one end of one of the parts is extended by the corresponding end of the other piece. As shown in Fig. 3, the right-hand piece 11 of the upper section 10 (shown in the drawings) projects by the left-hand piece. As before stated, the parts or halves of the oil-ring 10 are similar in construction and are assembled with the projecting ends of the pieces 11 overlapping. In the construction shown in Figs. 2 and 3 the overlapping pieces 11 of the sections 10 are connected together by bolts 15 and nuts 16, each bolt passing through the radial portion of one piece 10 of one half and through the radial portion of the opposite piece 10 of the other half. In practice one bolt 15 and corresponding nut 16 may be replaced by a rivet connection, as shown in Fig. 4, sufficient clearance being left between the adjacent abutting ends of the pieces 10 to allow of relative movement of the parts of the ring about the rivet as a hinge.

In placing the oil-rings in place in the bearing the oil-rings are opened at one or more joints and are threaded through the passages 6, after which the parts of the ring are all secured together. As is clearly shown in Fig. 3, the convex corner at the junction of the radial portion 12 and corresponding portion 13 of each piece 10 is rounded. This results in the formation of a small V-shaped groove 17 in the inner surface of the oil-ring proper, extending all the way around the ring between the two circular parts composed each of the pieces 10, the ends of which abut together. The convex corners of the pieces 10 are rounded in the form shown, because it is easier in shaping the material to form a round corner than a square corner and because the groove formed as a result of the rounded corners increases the amount of oil carried by the oil-ring from the supply at the bottom of the bearing-box to the surface to be lubricated as the ring is rotated by the shaft.

It will be observed that with the construction shown an oil-ring is obtained having the proper width measured parallel to the shaft 6 to give it stiffness in that direction and give it the proper amount of surface engaging the shaft and that the proper stiffness in a radial direction is obtained by means of the radial portions 10. As a result the oil-ring has the proper oil-carrying surface area and the proper mechanical strength and rigidity and is cheaply made and much lighter in weight than the oil-rings substantially rectangular in form heretofore commonly used. The advantage in weight of my construction over that heretofore in common use is marked. I have found that with comparatively large rings—say rings twenty-four inches in diameter—my ring may be made in the neighborhood of eight pounds lighter than the old form ring. The arc-shaped pieces 10 are quickly and easily formed from strips of sheet-brass or other sheet metal in any suitable bending-machine, and as the joints require little or no machining the construction can be put together very cheaply.

While I have hereinbefore described and illustrated the best form of my invention now known to me, it will be obvious to those skilled in the art that changes may be made in the form in which I have shown my invention as embodied without departing from the spirit of my invention, and I do not wish the claims hereinafter made to be limited to the particular construction shown more than is made necessary by the state of the art.

What I claim as new, and desire to secure by Letters Patent of the United States, is—

1. An oil-ring made in parts or sections, each part being formed of two arc-shaped pieces secured together so that one end of each piece projects by the corresponding end of the other piece, and means for securing the two parts together.

2. An oil-ring having a circumferential groove formed in its shaft-engaging surfaces.

3. An oil-ring formed out of sheet metal and comprising a cylindrical shaft-engaging portion and a radial portion extending therefrom.

4. An oil-ring formed of curved pieces of metal L-shaped in cross-section, one leg of the L in each piece extending parallel to the shaft, and the other leg radially.

5. An oil-ring formed of two circular parts each circular part being L-shaped in cross-section with one leg of the L parallel to the axis of the leg and the other leg of the L radial thereto, the radial portions of the two parts being placed side by side and secured together.

6. An oil-ring formed of two circular parts, each circular part being L-shaped in cross-section with one leg of the L parallel to the axis of the leg and the other leg of the L radial thereto, the radial portions of the two parts being placed side by side and secured together, the convex edge of one of said parts being rounded.

7. An oil-ring made in parts or sections, each section being formed of arc-shaped pieces secured together with one end of one piece projecting by the corresponding end of another piece, and means for securing together the projecting ends of adjacent sections.

8. An oil-ring made in parts or sections, each section being formed of arc-shaped pieces secured together with one end of one piece projecting by the corresponding end of another piece, and means for hinging together the projecting ends of adjacent sections.

9. An oil-ring made in two halves or sections, each section being formed of two semi-circular arc-shaped pieces secured together with the end of one piece projecting by the corresponding end of the other piece, and means for securing the projecting ends of adjacent section ends together.

10. An oil-ring formed of two circular parts, each circular part being L-shaped in cross-section, with one leg of the L parallel to the axis of the leg and the other leg of the L radial thereto, the radial portions of the two parts being placed side by side and secured together and the convex edges of the parts being rounded whereby a circumferential groove is formed in the shaft-engaging portion of the oil-ring.

In witness whereof I have hereunto set my hand this 4th day of April, 1905.

HENRY GEISENHÖNER.

Witnesses:
 BENJAMIN B. HULL,
 HELEN ORFORD.